April 27, 1965 G. R. CHAFEE, JR 3,180,038
AUTOMATIC DRYER CONTROL CIRCUIT
Filed Jan. 26, 1962 5 Sheets-Sheet 1

INVENTOR.
GLENN R. CHAFEE JR.
BY *Derek P. Lawrence*
HIS ATTORNEY

April 27, 1965     G. R. CHAFEE, JR     3,180,038
AUTOMATIC DRYER CONTROL CIRCUIT
Filed Jan. 26, 1962     5 Sheets-Sheet 2

INVENTOR.
GLENN R. CHAFEE JR.
BY
HIS ATTORNEY

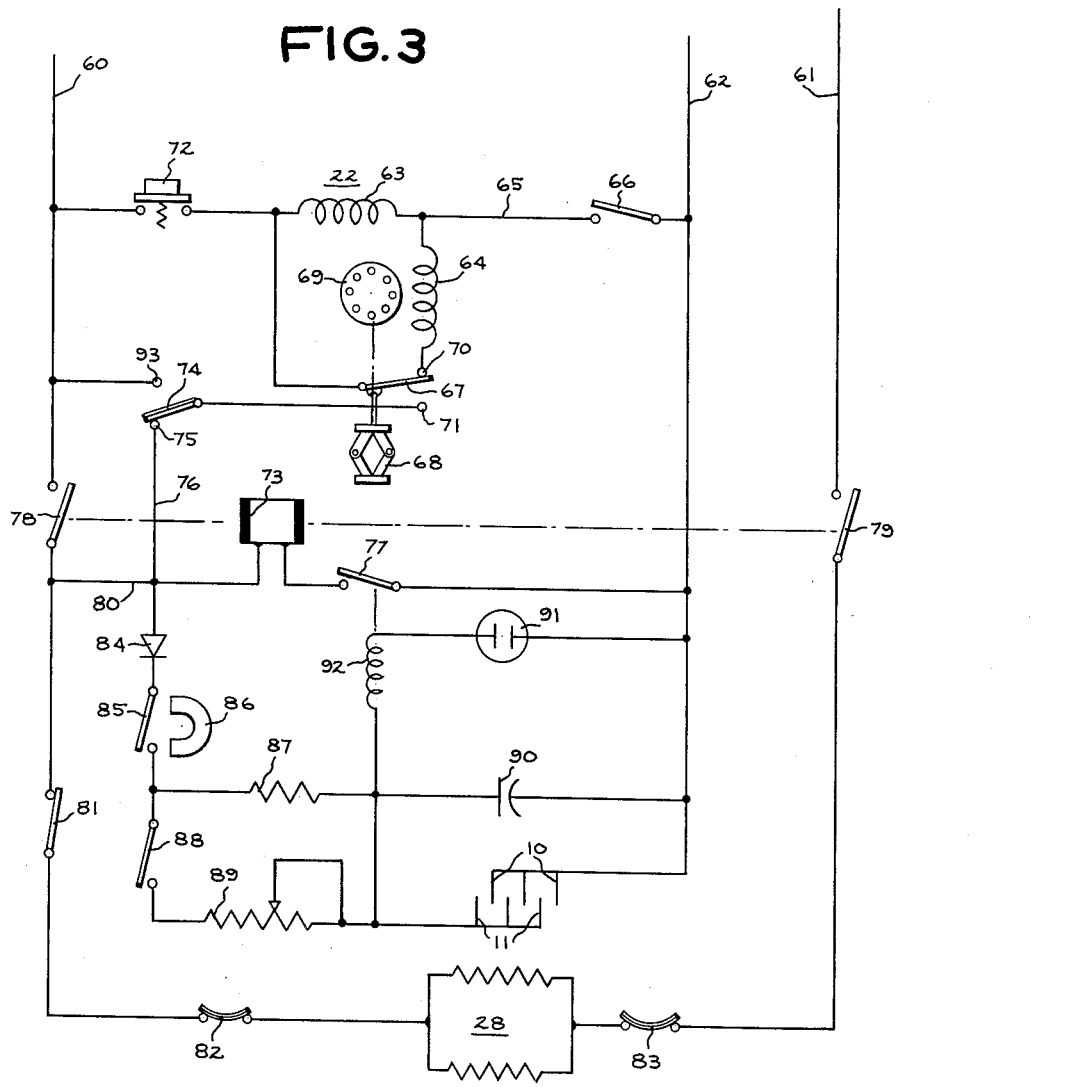

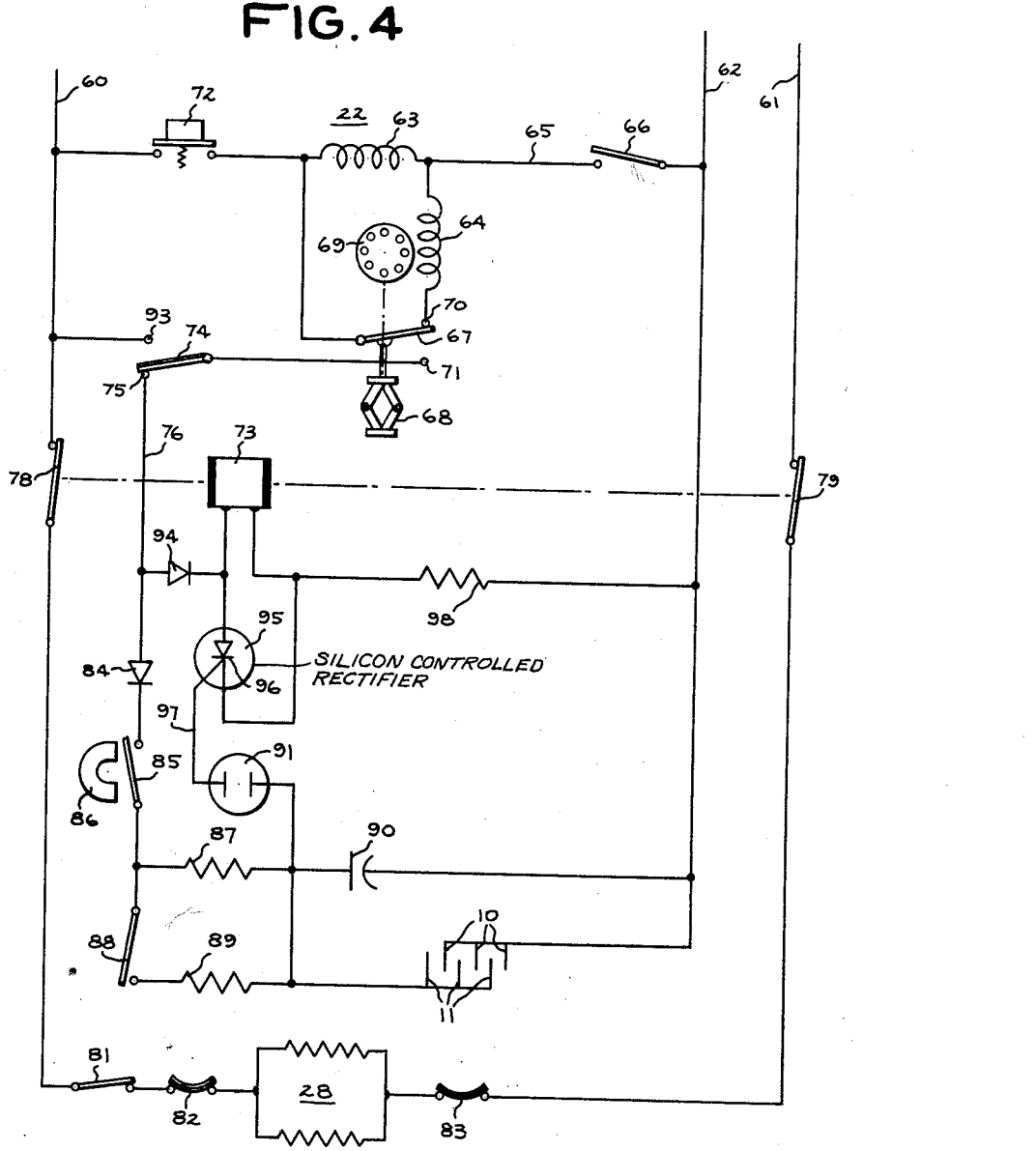

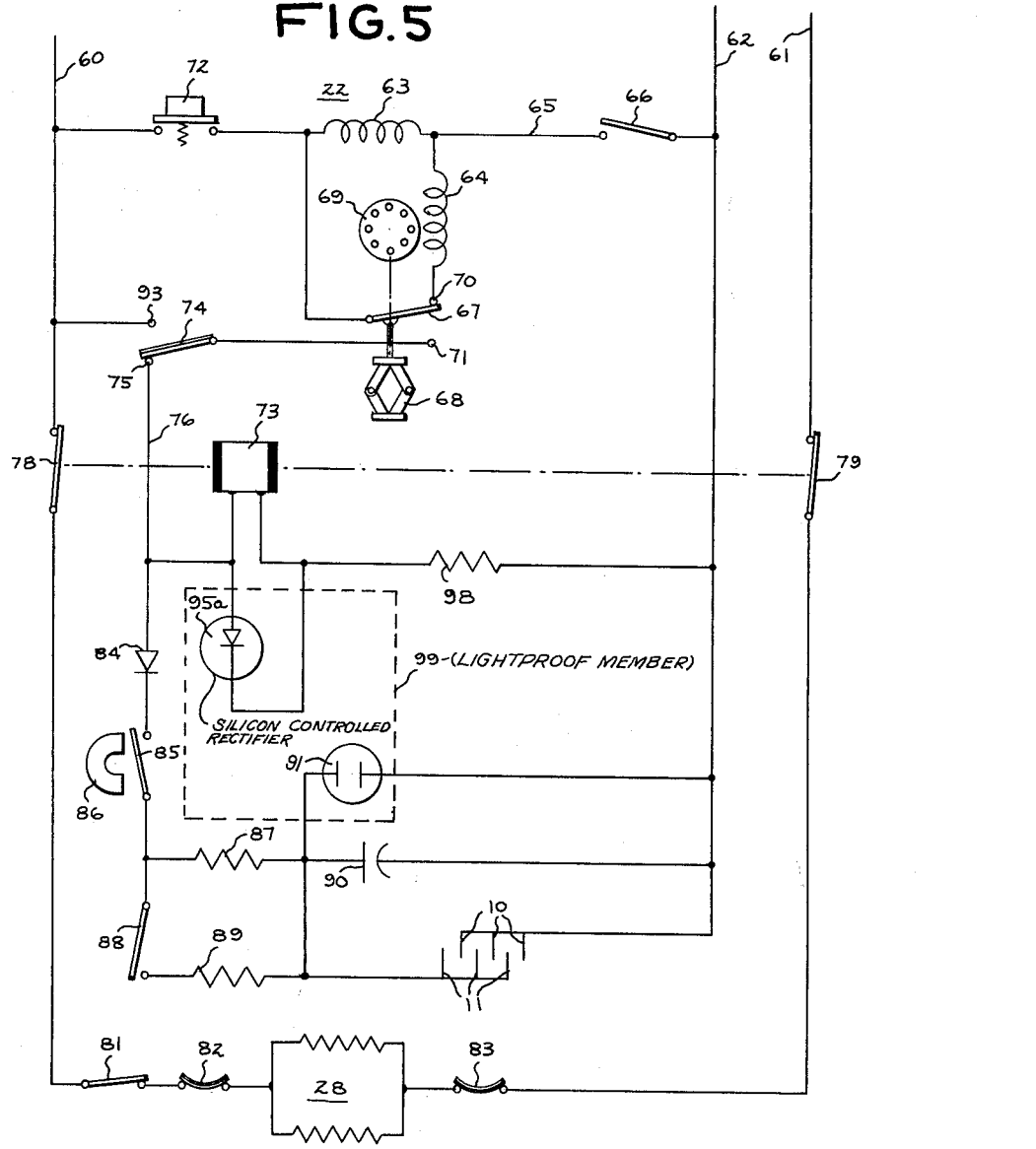

United States Patent Office 3,180,038
Patented Apr. 27, 1965

3,180,038
AUTOMATIC DRYER CONTROL CIRCUIT
Glenn R. Chafee, Jr., Louisville, Ky., assignor to General Electric Company, a corporation of New York
Filed Jan. 26, 1962, Ser. No. 169,055
11 Claims. (Cl. 34—45)

This invention relates to domestic fabric drying machines, and more particularly to an electrical control system for use in such machines.

There are many types of dryer control circuits wherein it is highly desirable that, upon the occurrence of a specified event, the dryer run for a predetermined period of time and then shut itself off. This may be, for instance, a purely timed operation where the event is the initiation of operation of the machine; alternatively, it may be an operation wherein the dryer is of the type which causes an action in response to an almost-dry condition of the fabrics—in such a case, an additional period of operation of ten to twenty minutes may be desirable in order to insure complete dryness of the clothes. This latter instance often occurs in so-called automatic-dry control circuits, wherein the system has a reasonable degree of sensitivity to the amount of moisture in the fabrics, or clothes, as long as there is a substantial amount of moisture, but because the sensitivity to the condition of the clothes decreases as the clothes approach dryness, it is necessary to provide some additional period of operation at the end to insure complete dryness.

It is, of course, possible to use a conventional timer for the desired timing operation. However, to an increasing extent, there are being used dryness control devices which utilize the charging and discharging of a capacitor to initiate or terminate a function; consequently, it is highly desirable that the charging of this capacitor be made such that it will fully provide the desired timing effect. With presently known structures, even relatively expensive capacitors (for the appliance field) and very high resistances provide only a short period, on the order of a very few minutes, of timing operation in a conventional RC time constant circuit.

It is therefore a most desirable feature to provide a circuit wherein an RC system may be used for timing purposes and wherein, by virtue of an improvement to the circuit, relatively conventional and economically purchased components may be used while still obtaining a substantial length of timing operation.

A further object of my invention is the incorporation of such an improved RC system in a control circuit for clothes dryers, wherein the charging of the capacitor of the RC circuit provides in a novel and improved manner the desired result of terminating the drying operation.

It is also an object of my invention to provide an improved RC type timing circuit wherein, by suitable cooperation of moving parts of the clothes drying machine with the circuit, a substantial timing period may be obtained with relatively economical components.

A further object of my invention is to provide, for use in cooperation with such an RC system, an improved dryness sensing circuit wherein termination of the drying operation is provided in response to the tolling of a suitable period by the RC circuit.

In carrying out my invention in one form thereof, I provide a fabric drying machine which has the conventional chamber for receiving fabrics to be dried, together with heating means arranged to heat fabrics placed in the chamber. Also, I provide cyclically moving means for tumbling the fabrics within the chamber. In many conventional dryers, this may actually mean rotating the chamber itself at a suitable tumbling speed. The chamber has spaced conductors positioned so that when the fabrics are tumbling they bridge these spaced conductors electrically, with the electrical resistance between the conductors accordingly increasing as the fabrics become dry.

In this arrangement I provide a time delay circuit which includes in series a rectifier, a normally open switch, a high resistance resistor, and a capacitor, the last two elements being the conventional components forming an RC system. The conductors are connected across the capacitor so that when the fabrics are wet and they are being tumbled within the chamber they form a low resistance bridge, or short circuit, across the capacitor, and prevent its being charged. However, as the fabrics become dry, they permit charging of the capacitor subject to the high resistance of the resistor and the condition of the normally-open switch. In addition to their conventional function of tumbling the fabrics, the cyclically moving means are arranged to provide cyclic closing of the normally open switch for a part of each cycle, preferably a small part thereof.

The operation of the heating means is controlled by suitable electric means which is effective when energized to cause the heating means to operate. This electric means is normally energized during the cycle, but in response to a predetermined charge across the capacitor the electric means becomes de-energized and then, preferably, operates to terminate the drying cycle. By using the cyclically moving means to reduce the rate at which the capacitor is charged during the operation, the rating of the capacitor and the magnitude of resistance of the resistor may both be decreased for any desired period of delay to be obtained from the RC system.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

In the drawings,

FIGURE 3 is a schematic illustration of my improved control system as used in the control of the drying machine in FIGURES 1 and 2;

FIGURE 4 is a second embodiment of my invention as it may be applied to the drying machine of FIGURES 1 and 2; and FIGURE 5 is a third embodiment of my invention as it may be applied to the drying machine of FIGURES 1 and 2.

Figure 1:
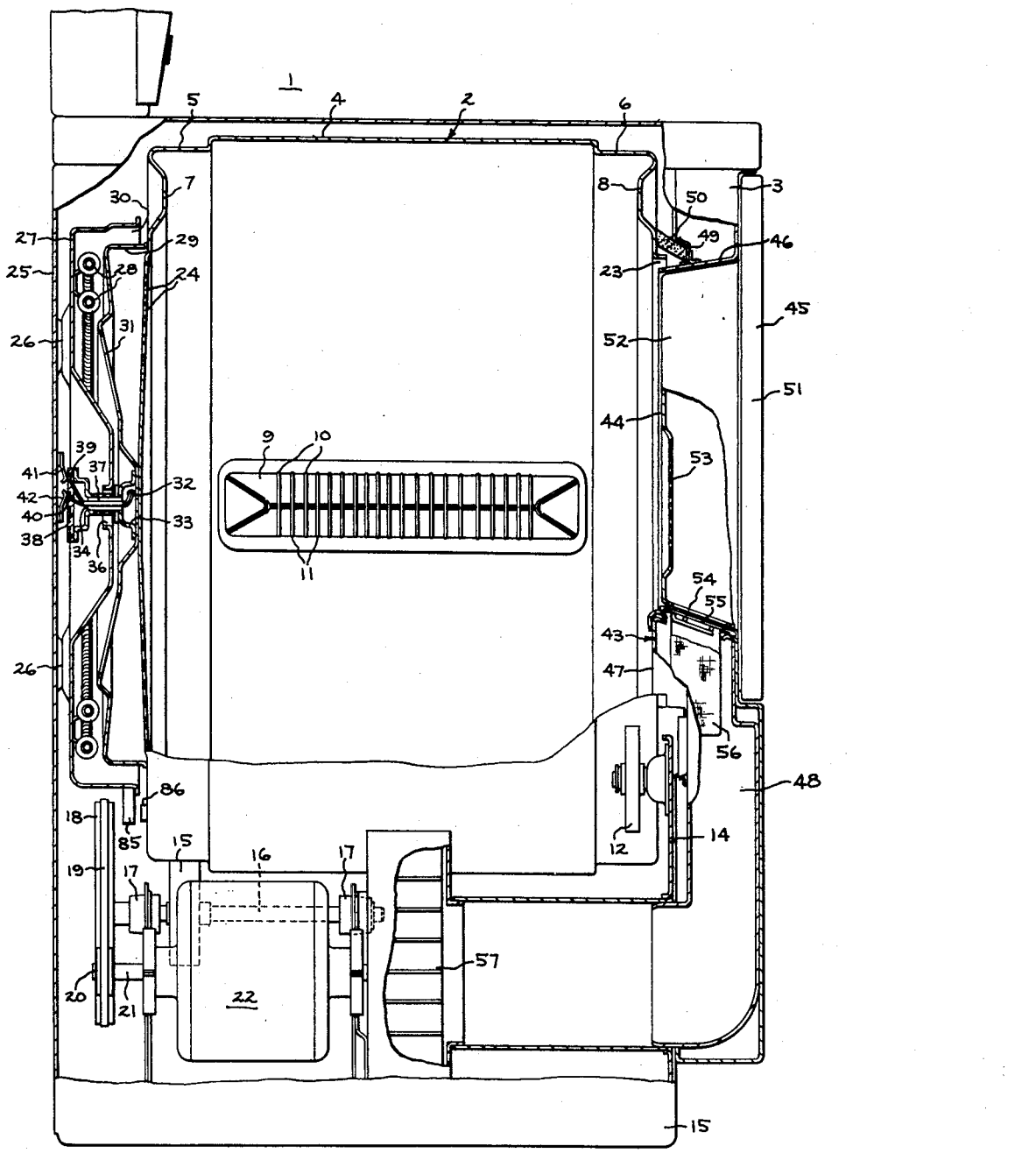
FIGURE 1 is a side elevational view of a clothes dryer incorporating my improved dryer control arrangement, the view being partly broken away and partly sectionalized in order to illustrate details.
Figure 2:
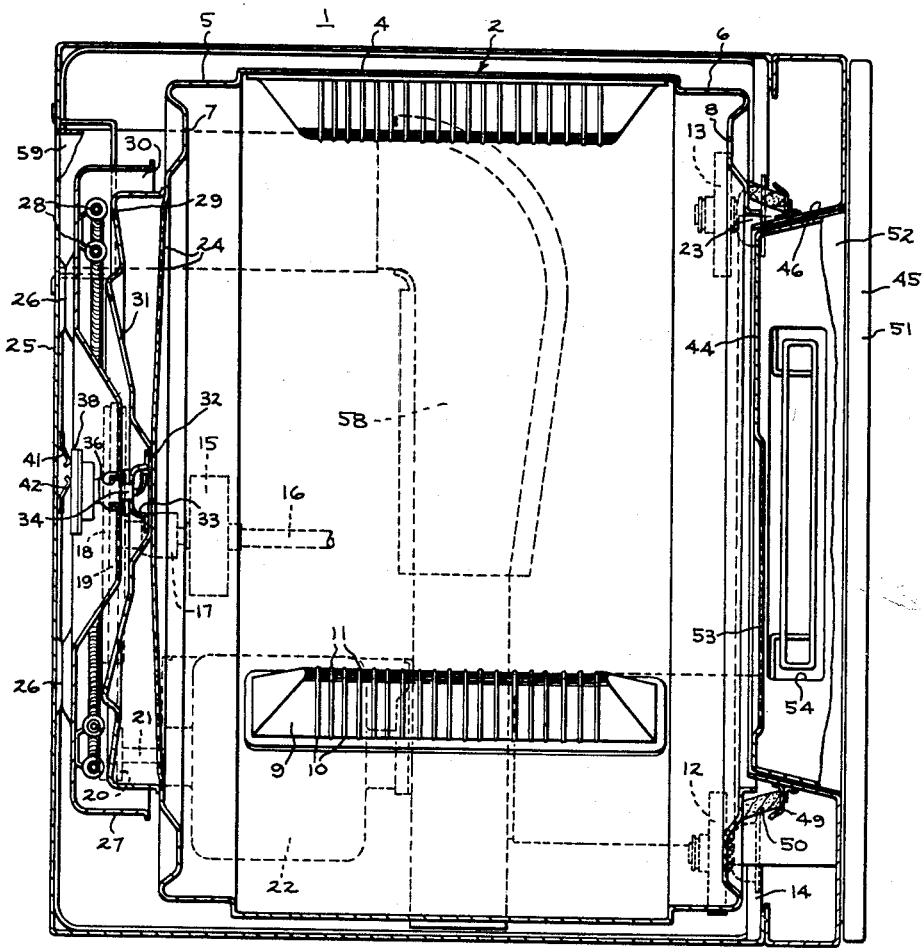
FIGURE 2 is a horizontal sectional view of the dryer of FIGURE 1, with certain surfaces broken away and partly sectionalized to illustrate further details.

Referring now to FIGURES 1 and 2, I have shown therein a domestic clothes dryer 1 including a clothes tumbling container or drum 2, provided with a suitable outer casing or cabinet 3, which completely encloses the drum on all sides. The drum is mounted for rotation within cabinet 3 on a substantially horizontally axis and is generally cylindrical in shape, having a first cylindrical outer wall portion 4, second and third cylindrical outer wall portions 5 and 6 located respectively adjacent the ends of the drum, a back wall 7, and a front wall 8. Outer wall portions 4, 5 and 6 are imperforate over their entire length, so that the entire outer shell of the basket is imperforate. On the interior surface of central portion 4 there is provided a plurality of clothes tumbling ribs 9 formed of a suitable heat resistant insulating material. Over each rib extend a number of conductors or wires 10 and 11 which alternate with each other along the length of the rib. The purpose of these wires and the structure to which they are related will be more fully discussed herebelow.

The front of drum 2 is rotatably supported within the outer casing 3 by means of a pair of idler roller wheels 12 and 13 which are rotatably secured to the top of an upwardly extending member 14 secured at its base to the bottom 15 of the machine (FIGURE 1). Rollers 12 and 13 are disposed beneath the drum in contact with portion 6 thereof. The rear end of the drum receives its support from the roller wheel 15 which is positioned beneath portion 5 of the drum in supporting and frictionally driving engagement therewith.

Roller 15 is secured on a shaft 16 supported in bearings 17. Shaft 16 is secured to a pulley 18, which is driven from a belt 19 in turn powered by a pulley 20 mounted on the end of a shaft 21 of an induction-type electric motor 22. The motor, pulleys, and roller 15 are so proportioned to drum 2 and to each other that drum 2 is rotated by roller 15 at the appropriate speed to provide tumbling action for articles of clothes and other fabrics placed therein.

In order that a stream of drying air be introduced into and passed through the clothes drum, the drum is provided with a central aperture 23 in its front wall 8 and with a plurality of perforations 24 extending in an annulus around the back wall 7. Rigidly secured to the rear wall 25 of casing 3 by any desired means such as welding at suitable points 26, for instance, is a baffle member 27 which has secured thereto heating means such as an electric heater 28, appropriately insulated from the baffle member.

Heating elements 28 may be annular in shape so as to be generally co-extensive with perforations 24 in drum 2. The baffle member 29 is rigidly secured to the back wall 7 of the drum outside the ring of perforations 24 and with the stationary baffle 27, so that an annular air inlet 30 is in effect formed by the baffles 27 and 29. Baffle 29 is further provided with an annular series of openings 31. In this manner, a passage is formed for air to enter annular opening 30 between the baffles, pass over the heating elements 28, and through openings 31 and perforations 24 and to the interior of drum 2.

In addition to the air guiding function, the baffles 25 and 27 help rollers 12, 13, and 15 to support the drum 2. Secured to the central portion 32 of baffle 29 is a bracket 33 to which in turn is secured a stub shaft member 34 substantially coaxially positioned relative to drum 2. The central portion of baffle 27 has a slot-like opening 36 formed therein. The slot is suitably formed (as is more fully described in Patent 3,009,259 issued on November 21, 1961 to William F. Simpson and assigned to the same assignee as this invention) so as to permit stub shaft 34 a limited amount of movement in the vertical direction but virtually no movement in the horizontal direction. Thus, the slight vertical motions of the drum which result from the tumbling of the clothes can be accommodated while at the same time undesirable horizontal motion is affirmatively prevented by engagement of stub shaft 34 in slot 36.

It is to be noted at this point that the stub shaft 34 is provided with a central opening 37. The wires 10 and 11 all extend from ribs 9 around the back of the drum 2 and down through suitable openings in the baffle 29; the wires then extend through the opening 37 formed extending through the shaft 34. At the outer end of shaft 34 a disk 38 may be formed as shown with the conductors 10 being secured to a conductive outer ring portion 39 and the conductors 11 being secured to a conductive inner portion 40. Portions 39 and 40 are electrically insulated from each other; this may readily be done by making disk 38 of an insulating material, with the ring portions embedded therein. A contact member 41 is continuously in contact with the conductor portion 39, while similarly a conductor member 42 is continuously in contact with conductive portion 40 of the disk. Thus, all of the conductors 10 are connected to a stationary conductor 41, while all of the conductors 11 are similarly connected through similar means to a stationary conductor 42.

The front opening 23 of the drum is substantially closed by means of a stationary bulkhead generally indicated by the numeral 43. Bulkhead 43 is made up of a number of adjacent members including the inner surface 44 of an access door 45 mounted on the dryer cabinet, stationary frame 46 for the door, the inner surface 47 of an exhaust duct 48, and an annular flange 49 mounted on the frame 46 and on the duct wall. It will be noted that a suitable clearance is provided between the inner edge of the drum opening 23 and the edge of bulkhead 43 so that there is no rubbing between the drum and the bulkhead during rotation of the drum. In order to prevent any substantial air leakage through opening 23 between the interior and the exterior of the drum a suitable ring seal 50, preferably formed of felt-like material, is secured to flange 49 in sealing relationship with the exterior surface of drum wall 8.

Front opening 23, in addition to serving as part of the air flow path through the drum, also serves as a means whereby clothes may be loaded into and unloaded from the drum. The door 45, whose inner surface forms part of the bulkhead closing the opening, is mounted on cabinet 3. When the door is opened, clothes may be placed into or removed from the drum through the door frame 46. It will be noted that the door includes an outer flat imperforate section 51 and an inwardly extending hollow section 52 mounted on the flat outer section. Hollow section 52 extends into the door frame 46 when the door is closed, and the door surface 44 which comprises part of the combination bulkhead 43 is actually the inner wall of the hollow section.

The air outlet from the basket is provided by a perforated opening 53 formed in the inner wall 44 of door section 52. The bottom wall section of door 52 and the adjacent wall of door frame 46 are provided with aligned openings 54 and 55, opening 55 providing the entrance to duct 48. As shown, a lint trap 56, which may comprise a fine mesh bag, is preferably positioned in exhaust duct 48 at opening 55, the bag being supported by the door. Duct 48 leads to suitable air moving means which may, as shown, comprise a centrifugal blower 57 mounted on the shaft of motor 22 and thus driven directly by the motor. The outlet of blower 57 communicates with an outlet duct 58 (FIGURE 2) which extends through an opening 59 in the back 25 of cabinet 3.

The operation of dryer 1 is controlled by a new and improved control system as shown in the circuit diagram of FIGURE 3. As shown there, the entire control system of the machine may be energized across a three-wire power supply system which includes supply conductors 60 and 61 and a neutral conductor 62. For domestic use, the conductors 60 and 61 will normally be connected across a 220 volt power supply, with 110 volts appearing between the neutral line 62 and each of the conductors and with the neutral line being at ground voltage. Motor 22 is connected between conductor 60 and 62; the motor includes in the usual manner a main winding 63 and a start winding 64, both connected at a common end to a conductor 65 which, through a conventional door switch 66 (which is closed when door 45 is closed and is opened when the door is open) connects conductor 65 to supply conductor 62.

The start winding 64 is connected in parallel with main winding 63 through a speed responsive device such as that shown at 68, which is schematically shown as connected to the rotor 69 of the motor. Switch 67 is engageable with either of contacts 70 or 71, being engaged with contact 70 when the machine is at rest and moving into engagement with contact 71 as the machine comes up to speed. It can readily be seen that engagement with contact 70 connects the start winding 64 in parallel with main winding 63, while movement of the switch 67 away from this position opens the start winding. Thus, as the rotor 69 comes up to speed, the start winding becomes deenergized and the motor then continues to run on the main winding 63 alone.

The starting of the motor is provided by a manually operable pushbutton switch 72 which connects the motor to supply conductor 60. This switch, which is normally biased to an open position, may be pushed closed by manual pressure so that energization of the motor is provided. Within less than a second, under normal circumstances, the motor comes up to speed so that switch 67 engages contact 71.

As a result of this movement of the centrifugally operated switch 67, an energizing circuit between conductor 60 and 62 for a main relay 73 is provided as follows: starting at conductor 60, the circuit extends through switch 72, switch 67, contact 71, a thermostatic switch 74 (shown as a bimetallic element) which is normally in engagement with a contact 75, a conductor 76, the relay 73, a normally closed switch 77, and the conductor 62. As a result of this energization of the relay 73, the two switches 78 and 79 in lines 60 and 61 respectively are closed. The closure of switch 78 then provides an energizing circuit for main motor winding 63 as follows: Starting from conductor 62, the circuit extends through conductor 65 and the main winding 63 itself, and then through switch 67 and contact 71, switch 74, contact 75, conductors 76 and 80, and then through relay contact 78 to conductor 60. Thus, an energizing circuit independent of manual switch 72 is provided at this point and therefore the motor continues to run after the switch 72 is released. Also, the relay 73 remains energized across conductors 60 and 62 through its contact 78.

Once the relay 73 has closed switch contacts 78 and 79, the main heaters 28 of the machine are then energized across 220 volts through a circuit which, starting with conductor 60, extends through switch 78, a manually operable switch 81, a thermostat 82, the heaters 28, a second thermostat 83, and then through switch 79 to conductor 61. It will be understood that, in the conventional manner, thermostat 82 may be of the type which is positioned so as to sense temperature within the drum 2, and which opens at a relatively low temperature, such as for instance 135° F., so as to insure that the drying operation will be carried out at a temperature which is not undesirably high insofar as the fabrics are concerned. Similarly the thermostat 83 may be a conventional safety thermostat which is in a position to sense the incoming air temperature and to sense a temperature rise if the blower 57 should fail to pass air over it; thermostat 83 opens at a relatively high temperature such as, for instance, on the order of 300° F., to prevent fire hazards from the machine due to failure of the air flow.

It can thus be seen from the foregoing that by manual depression of pushbutton switch 72 for a period of two seconds or so, the machine is started so that motor 22 runs continually on main winding 63 to rotate the drum 2 and operate the blower 57, and so that the heaters 28 are energized as necessary to keep the clothes in the drum 2 at a desirable drying temperature.

In order to control the length of the drying operation, a direct current circuit is provided which includes a conventional half-wave rectifier 84 such as a diode, so as to cause a half-wave D.C. current to pass through the components forming a part of the circuit to be described. It will be understood, in this connection, that the diode 84 is connected through conductor 80 and switch 78 to the conductor 60. From the diode, the circuit then continues through a normally open switch 85. Switch 85 is a reed switch, that is, it is a type of switch which includes two contact arms with at least one of the arms being formed of magnetic material so as to be readily movable in response to magnetic influence. As can be seen by reference to FIGURE 1, switch 85 is positioned so as to be adjacent to the periphery of the drum 2; more particularly, switch 85 is positioned so that a magnet 86 secured to the outer surface of the drum passes adjacent the switch 85 once for each revolution of the drum. As will be more clearly apparent below, this forms an important part of my invention concept.

From switch 85, the circuit may either extend through a resistor 87 alone or, alternatively, a manually operable switch 88 may be closed to cause a variable resistor 89 to be placed in parallel with the resistor 87. The resistor 87 is of a high magnitude of resistance, as high as is practical for the environment and use to which it is to be put. A value of six to fifteen megohms has been found to be typical for this purpose although this is not to be considered as excluding other possibilities, both lower and higher. Resistor 89 is of a much lower order of magnitude, for instance 500,000 ohms. It will thus be seen that under normal circumstances the resistor 87 alone will be in the circuit although, as will be explained below in connection with the operation of the machine, the resistor 89 may be included for special purposes.

The resistors 87 and 89 are connected in series relationship with a capacitor 90, and it will readily be seen that under normal circumstances the capacitor 90 and resistor 87 will together form an RC time delay constant circuit, with the length of the time delay (in seconds) being dependent in the usual manner on the product of the resistance in ohms multiplied by the capacitance in farads. Since, as will appear more clearly below, a fairly high time constant is desirable, a capacitor 90 of reasonably large capacitance is desirable, it being understood, however, that as the capacitance of such devices increases the cost does too at a relatively high rate; therefore, it is very important in the highly competitive field of home appliances to keep the cost of this relatively expensive component down as much as possible. Thus, for instance, a one microfarad capacitor has been found to be suitable for my purposes although higher and lower capacitances are not excluded. From the capacitor 90 the circuit then extends to conductor 62.

Connected across the capacitor is a voltage sensitive device 91, i.e., a device which becomes conductive only when a predetermined voltage is put across it. This function may readily be carried out by a relatively inexpensive glow tube such as, for instance, the glow tube which is commercially marketed by the General Electric Company under the model number NE-2. Included in series with glow tube 91 and in parallel with capacitor 90 is a coil 92 which, as shown, directly controls the switch 77; in this connection it will be understood that switch 77 may also be a reed switch of the same type as described in connection with switch 85. In this case, however, the reed switch will be of the type which is normally closed and where the action of the coil 92 causes the reed switch to open. It will be understood that as long as the capacitor 90 is not charged up to the firing voltage of glow tube 91, there will be no current passing through the coil 92 and therefore the switch 77 will remain closed. However, when the capacitor does become sufficiently charged the glow tube 91 will fire and will continue to fire until the capacitor is discharged; during this period of time the coil 92 is energized and opens the reed switch 77.

It is to be noted at this point that the conductors 10 and 11 described above in connection with FIGURES 1 and 2 are also connected across the capacitor 90. This means that as long as clothes are wet and are forming a low resistance bridge between the sensing fingers or conductors 10 and 11 there is essentially a short circuit across the capacitor and no charging will occur. As the clothes become dry, there starts to be a very appreciable resistance between the fingers 10 and 11 so that charging of the capacitor occurs, with the charging being subject to the characteristics dictated by the RC circuit. Thus, the capacitor 90 will not even start to charge while there is a substantial amount of moisture in the clothes; it is only as the clothes start to become dry that charging of the capacitor starts to occur.

Prior to explaining the operation of my improved system, it should be stated that, as the clothes start to become dry, a high resistance appears between fingers 10 and 11 substantially before the clothes are truly dry to the touch; that is, while the clothes still have a moisture retention of 15 to 25% (depending primarily upon the type of fabric) the capacitor has started to charge. This means that unless a reasonable additional period of time elapses after substantial resistance appears between fingers 10 and 11 the clothes will not be dry at the time the coil 92 is energized to open the switch 77. Since opening of switch 77 terminates the heating operation (as will be explained), it is imperative that a substantial period of time, on the order of at least 15 to 20 minutes, be provided once the capacitor has started to charge. However, when an RC system having the resistance and capacitance values set forth above is provided the time constant is only 15,000,000 times 0.000001, or 15 seconds. This manifestly is an inadequate total period of time for proper dryness of the clothes to be achieved under the above circumstances.

It is consequently necessary either to provide an additional timing device which is started after the capacitor causes firing of glow tube 91, or else to provide some improvement to the system which will effectively lengthen the time constant without increasing materially the cost of the components. This, in effect, is what I have done by the addition of switch 85 and magnet 86, with switch 85 and magnet 86 being only cyclically adjacent each other so that for a major part of each cycle (in this case, each rotation of the drum) the switch 85 is open and only during a small part of each drum rotation, while the switch 85 and the magnet 86 are adjacent, is the switch closed. What this does is to permit charging of capacitor 90 only during the relatively brief period of time that the switch 85 is closed, and to interrupt the charging of the capacitor 90 while the switch 85 is open.

In this manner, the time constant of the system is vastly increased at relatively small expense since reed switches and magnets of the type shown are relatively economically purchased components. It has been found by providing the reed switch 85 and magnet 86 that, for instance, the total time before the capacitor 90 is charged enough to cause firing of glow tube 91 can be moved up from about 15 seconds to a period of 15, 20 or even 30 or 40 minutes without any difficulty at all. Thus, the need for highly expensive components in the time constant circuit or for an additional timer is obviated by this relatively simple structure.

With these thoughts in mind the operation of the circuit will be described. It has already been described how, when the switch 72 is depressed, the motor is started and then continues operation through the centrifugal switch 67. Also the heater starts operation as a result of the energization of relay 73 and the closing of relay contacts 78 and 79. It should be pointed out at this time that, as the temperature of the clothes, as determined by thermostat 82, is approached, the thermostat 74 trips up to the position where it engages a contact 93. This does not affect the operation of the motor since there is still the necessary connection from contact 71 to supply conductor 60. It does, however, make the continued operation of the motor independent of relay switch 78.

Thus, when wet clothes are inserted into the drum 2 as described above, and the button 72 is pushed, the motor 22 starts to operate and continues to operate even though, as a result of the heater also being energized, the thermostat 74 flips up into engagement with contact 93. This action of heating, under the control of thermostat 82, continues with heated air being blown through the tumbling drum as a result of the energization of the motor 22. Initially, because of the fact that the wet clothes bridge the fingers 10 and 11, there is no charging of capacitor 90 and the untimed operation continues. However, as the clothes start to approach dryness, the substantial resistance between the fingers 10 and 11 allows the capacitor to start charging subject, however, to the interruptions caused by the opening of switch 85.

Thus, because of the open condition of switch 85, the charging occurs only during a brief period of each rotation of the drum when the magnet 86 causes switch 85 to close. As a result, when the clothes start to approach dryness, what amounts to a timing operation is started with the relatively economically purchased components 87 and 90 implemented by the reed switch 85 and magnet 86. In this manner, a proper degree of dryness is achieved because of the fact that the charging of capacitor 90 is slowed up to the desired extent. When the capacitor 90 finally charges sufficiently so that the voltage across it represents the firing voltage for glow tube 91, the glow tube fires and the coil 92 is energized to open switch 77 until the capacitor discharges sufficiently to shut off the glow tube again. This in turn de-energizes the main relay 73 and causes the relay contacts 78 and 79 to open.

Because the thermostat 74 is in its up position and in engagement with contact 93, the motor 63 continues to operate independently of the opening of the relay switches. However, the heater 28 is permanently de-energized and in addition the relay 73 is also de-energized. In addition, no current can pass into the D.C. control circuit which includes the capacitor 90 and therefore the capacitor 90 does not charge. Thus, the drum continues to be rotated by motor 22 without, however, any heating operation occurring. As a result of the de-energization of the heaters, the clothes start to cool down, particularly since cool air is now being blown over them by blower 57 operated by motor 22.

After the clothes have cooled to a predetermined temperature, the thermostat 74 will flip back to the position in which it is shown. In this position the motor is dependent upon switch 78 for its continued energization, but since this relay switch is now open the motor is de-energized and the entire operation is terminated with the clothes in a properly dried condition. Thus, a fully automatic drying operation is provided with the structure being sensitive to the dryness of the clothes and then, when the clothes are almost dry, providing an additional appropriate period of heat operation to effect the final drying necessary; further a cool-down is automatically provided.

It will be understood that in most present-day dryers additional types of cycles are available to the operator as well as the conventional automatic drying cycle, thus for instance, there is the type of cycle known as the "fluff" cycle in which the operator merely desires to tumble dry clothes for a period of time in order to fluff them out. This is readily achieved with my structure by opening of switch 81. The manual opening of this switch, and then the start of an operation by closure of switch 72, causes the motor to start operating, and the capacitor 90 to start charging immediately since the clothes, being dry, constitute a high-resistance bridge across fingers 10 and 11. Therefore, the timing operation of the RC circuit, as controlled by switch 85, starts immediately and a timed period of tumbling without heat will be provided as intended for this type of operation.

In summary then, it can be seen that the essence of my concept lies in the provision of the switch which is in series with the RC circuit components and which is cyclically closed by a magnet secured to move with some part of the drive system of the machine; in the present case, the drum is believed to provide the most desirable solution. It can readily be seen, though, that a pulley could just as easily have been used, or even the motor shaft.

Also, where it is desired that the clothes rather than being fully dried, be sufficiently damp to permit that they be ironed without any sprinkling being required, the switch 88 may be closed. Then the resistors 87 and 89 together constitute the resistor in the RC circuit. This decreases very substantially the total period of time provided, and as a result clothes in a damp condition at the end of a cycle may be obtained.

Turning now to FIGURE 4 there is shown a second embodiment of my invention, with the same numerals being used for parts which are identical to those of FIGURE 3. In the structure of FIGURE 4, a second half-wave rectifier or diode 94 is provided in series with the relay 73 which accordingly may be made to operate on a substantially lower voltage than in the structure of FIGURE 3 where the relay 73 was across the full line voltage. It will be understood that relay 73 in this case is of a type which will keep its contacts 78 and 79 closed even though energized only through a half-wave rectifier. In parallel with the relay 73, there is provided a conventional silicon controlled rectifier 95 having a gate 96 to which is connected, by a conductor 97, the glow tube 91. The other end of the glow tube is connected as before to a point intermediate the resistor 87 and the capacitor 90. In series with both the relay 73 and the silicon controlled rectifier 95 there is provided a suitable resistor 98.

As is well known in connection with silicon controlled rectifiers, the rectifier 95 does not conduct until a certain minimum current and voltage is applied to the gate, at which time the rectifier breaks down and acts as an ordinary rectifier. It will readily be seen that when this occurs there will be a short circuit across the relay 73 which in effect causes de-energization of the relay. Thus, in this case the firing of the glow tube 91 causes a voltage to be applied to the gate 96 of rectifier 95 to cause the rectifier to conduct and thereby short out the relay 73. Since diodes 84 and 94 provide simultaneous half-waves, the shorting out of relay 73 occurs during one of its energized half-wave periods; this de-energizes the relay and opens the switches 78 and 79.

A further concept for the control of the relay 73 by means of a light-triggered silicon controlled rectifier is shown in FIGURE 5. In FIGURE 5 it can be seen that the glow tube 91 is connected directly across the capacitor 99 rather than being connected across the capacitor through the gate of the rectifier 95a. However, the glow tube is located in a completely closed light-proof member 99 with the rectifier so that when it fires the flash of light will be sensed by the silicon controlled rectifier. Since the silicon controlled rectifier must be completely shielded from light to maintain its blocking characteristics, the light of the firing glow tube causes the silicon controlled rectifier to conduct, and in this manner the relay 73 is shorted out as before.

Another additional concept shown in FIGURE 5, insofar as the use of the silicon controlled rectifier is concerned, lies in the use of the type of silicon controlled rectifier which is of the so-called non-blocking type. This type acts as a regular silicon controlled rectifier in one direction and as a low voltage "zener" diode in the other direction. This type of silicon controlled rectifier eliminates the necessity for an additional diode rectifier such as the rectifier 94 of FIGURE 4. In the event such a specialized type of silicon controlled rectifier should be used, it is, then, possible to eliminate the additional diode.

It will be seen from the foregoing that my invention provides an improved control system for fabric drying machines wherein a time constant system is incorporated which provides a suitable time delay without need for expensive or impractical components.

While in accordance with the patent statutes I have described what at present are considered to be the preferred embodiments of my invention, it will be obvious to those skilled in the art that various changes and modifications may be made therein without departing from the invention. For instance, while use of a permanent magnet and a switch of magnetic material is preferred in the achievement of a cyclically opening and closing switch, other mechanical and electrical structures, cyclically operated to effect the same purpose, will readily come to mind. It is therefore aimed in the appended claims to cover all such equivalent variations which fall within the true spirit and scope of my invention.

What I claim as new and desire to secure by Letters Patent of the United States is:

1. A fabric dryer comprising: a chamber for receiving fabrics to be dried; heating means arranged to heat fabrics in said chamber; cyclically moving means for tumbling fabrics within said chamber; said chamber having spaced conductors positioned so as to be bridged by tumbling fabrics whereby said conductors are provided with a low resistance electrical bridge when the fabrics are wet and the electrical resistance between said conductors increases as the fabrics become dry; a time delay circuit including in series a rectifier, a switch, a high resistance resistor, and a capacitor, said conductors being connected across said capacitor thereby to substantially prevent charging of said capacitor when wet fabrics are being tumbled in said chamber, said cyclically moving means being arranged to provide cyclic opening and closing of said switch during each cycle; electric means effective when energized to provide operation of said heating means; and means responsive to a predetermined charge across said capacitor to de-energize said electric means.

2. A fabric dryer comprising: a chamber for receiving fabrics to be dried; heating means arranged to heat fabrics in said chamber; cyclically moving means for tumbling fabrics within said chamber; said chamber having spaced conductors positioned so as to be bridged by tumbling fabrics whereby said conductors are provided with a low-resistance electrical bridge when the fabrics are wet and the electrical resistance between said conductors increases as the fabrics become dry; a time delay circuit including in series a rectifier, a normally open switch, a high-resistance resistor, and a capacitor, said conductors being connected across said capacitor thereby to substantially prevent charging of said capacitor when wet fabrics are being tumbled in said chamber, said cyclically moving means being arranged to provide cyclic closing of said switch for a part of each cycle; electric means effective when energized to provide operation of said heating means; and means responsive to a predetermined charge across said capacitor to de-energize said electric means.

3. The apparatus defined in claim 1 wherein said means responsive to a predetermined charge is a negative impedance device.

4. The apparatus defined in claim 1 wherein said electric means is a power relay, and a heater circuit is provided to control said heating means, said heater circuit including a switch controlled by said power relay.

5. The apparatus defined in claim 4 including a normally closed reed switch in series with said relay and a coil positioned in controlling relation to said reed switch and connected across said capacitor in series with said means responsive to a predetermined charge, said coil being effective to open said reed switch when said predetermined charge across said capacitor causes current to flow through said coil.

6. The apparatus defined in claim 1 wherein said means responsive to a predetermined charge across said capacitor to de-energize said electric means includes a silicon controlled rectifier connected across said electric means and a voltage sensitive device connected across said capacitor through the gate of said silicon controlled rectifier, said capacitor being effective when charged to a predetermined extent to fire said voltage sensitive device to unblock said silicon controlled rectifier and cause it to short across said electric means thereby to de-energize said electric means.

7. The apparatus defined in claim 1 wherein said cyclically moving means includes a permanent magnet connected to a movable member of said cyclically moving means and a normally open stationary magnetically actuated switch positioned so that said magnet is adjacent said normally open switch during one part of each cycle thereby to close said normally open switch.

8. The apparatus defined in claim 7 wherein said chamber for receiving fabrics to be dried comprises a rotatable drum and said magnet is secured to said drum.

9. A fabric dryer comprising: a drum for receiving fabrics to be dried, electric heating means arranged to heat fabrics in said drum; an electric circuit for energizing said heating means; cyclically moving means including said drum for tumbling fabrics within said drum, said drum having spaced conductors positioned so as to be bridged by tumbling fabrics whereby said conductors are provided with a low-resistance electrical bridge when the fabrics are wet and the electrical resistance between said conductors increases as the fabrics become dry; a time delay circuit including in series a rectifier, a normally open switch, a high-resistance resistor, and a capacitor, said conductors being connected across said capacitor thereby to substantially prevent charging of said capacitor when wet fabrics are being tumbled in said drum, said cyclically moving means being arranged to provide cyclic closing of said switch for a part of each cycle; a relay having at least one relay switch in said heating means circuit controlling energization of said heating means, said relay closing said relay switch when energized and opening said relay switch when de-energized; and means responsive to a predetermined charge across said capacitor to de-energize said relay.

10. The apparatus defined in claim 8 wherein said cyclically moving means includes an electric drive motor; said apparatus further including a thermostatic switch having two positions, said motor being energized through said relay switch in the cold position of said thermostatic switch and being energized independently of said relay switch in the tripped position of said thermostatic switch, said thermostatic switch being set to trip substantially prior to attainment of a temperature indicating a dry condition of fabrics within said drum, whereby said motor continues to operate to tumble said drum after said relay is de-energized until the clothes cool sufficiently for said thermostatic switch to return to its initial cold position.

11. The apparatus defined in claim 4 wherein a silicon controlled rectifier is connected in parallel with said relay and said means responsive to a predetermined charge is a glow tube which fires at said predetermined charge, a lightproof enclosure being provided around said glow tube and said silicon controlled rectifier to prevent outside light from reaching said silicon controlled rectifier, whereby firing of said glow tube unblocks said silicon controlled rectifier to short across said relay.

References Cited by the Examiner
UNITED STATES PATENTS

| 2,045,381 | 6/36 | Elberty | 324—65 |
| 2,477,511 | 7/49 | Comb | 317—142 |
| 2,570,414 | 10/51 | Wapner | 324—65 |
| 2,621,808 | 12/52 | Blakeney | 317—142 |
| 2,812,976 | 11/57 | Hasenkamp | 324—65 |
| 2,878,579 | 3/59 | Fuchs | 34—45 |

FOREIGN PATENTS 877,553    9/61    Great Britain.

NORMAN YUDKOFF, *Primary Examiner*.